United States Patent [19]
McMath

[11] 3,794,244
[45] Feb. 26, 1974

[54] SEAL CENTERING AND RETENTION MEANS

[75] Inventor: Connie W. McMath, North Palm Beach, Fla.

[73] Assignee: United Aircraft Corporation, East Hartford, Conn.

[22] Filed: Dec. 20, 1971

[21] Appl. No.: 210,017

[52] U.S. Cl. ......................................... 239/265.41
[51] Int. Cl. ............................................ B64c 15/06
[58] Field of Search...... 239/265.39, 265.41, 265.43

[56] References Cited
UNITED STATES PATENTS

| | | | |
|---|---|---|---|
| 3,004,385 | 10/1961 | Spears et al. ................... | 239/265.41 |
| 2,870,602 | 1/1959 | Glenn .......................... | 239/265.39 |
| 3,288,374 | 11/1966 | Colville......................... | 239/265.41 |
| 3,460,763 | 8/1969 | Kopp ........................... | 239/265.43 |

*Primary Examiner*—Allen N. Knowles
*Assistant Examiner*—Andres Kashnikow
*Attorney, Agent, or Firm*—Jack N. McCarthy

[57] ABSTRACT

A nozzle having a set of flaps is formed on the exhaust end of a turbojet engine. Seal means are provided between adjacent flaps so that the area between the nozzle flaps will have a minimum flow loss between them as they are moved between their minimum area position and maximum area position. A seal flap is located between each pair of nozzle flaps and is maintained centered by a track on the seal flap and links connected to the adjacent sides of the nozzle flaps. A guide at the free end of the links is guided on said track. A guide member positions the flap axially and prevents it from being lifted from the surface of said nozzle flaps.

5 Claims, 5 Drawing Figures

SEAL CENTERING AND RETENTION MEANS

The invention disclosed herein was made in the course of or under a contract with the Department of the Air Force.

BACKGROUND OF THE INVENTION

This invention relates to sealing means for nozzle flaps of a turbojet engine. While seal means have been used in the past, the construction shown herein is believed to be new. Seal means are shown in U. S. Pat. No. 2,972,226; U. S. Pat. No. 3,004,385; U. S. Pat. No. 2,697,907; and U. S. Pat. No. 2,910,828.

SUMMARY OF THE INVENTION

A primary object of the present invention is to center a seal flap between cooperating nozzle flaps and act to retain the seal flap in position against the nozzle flaps.

In accordance with the present invention, a seal flap system is provided wherein the seal flap can be easily removed for inspection or access to the nozzle flaps.

In this seal flap, means are provided to maintain the seal flap against said nozzle flaps and keep it in its longitudinal position. Means are provided for preventing the disengagement of the track and slider member.

DESCRIPTION OF THE PREFERRED EMBODIMENT

Figure 1:
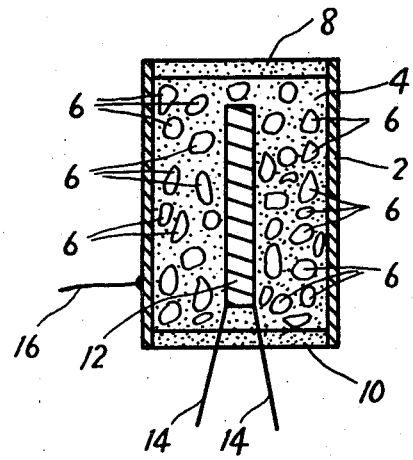
FIG. 1 is a view illustrating the application of the invention to a turbojet engine.

Referring to FIG. 1, the engine 2 shown includes a conventional compressor section 4, the burner section 6, turbine section 8 and exhaust duct and nozzle section 10. The nozzle is formed of main flaps 30, divergent flaps 60, and external flaps 70, said flaps being movable between a minimum opening position as shown by solid lines, and a maximum opening position as shown by the dotted lines. Each of the annular set of flaps have a cooperating set of seal flaps. Each seal flap is positioned along adjacent side edges of cooperating flaps to prevent an excessive amount of leakage therebetween. These seal flaps are pivotally mounted to each other in the same manner as the nozzle flaps. Each seal flap pivotal mounting is located radially inward from each pivotal mounting of cooperating nozzle flaps. For example, at the pivotal mounting 41 between the rear end of main flaps 30 and forward end divergent flaps 60 a pivotal mounting is positioned between the rear end of the seal flaps for main flaps 30 and the seal flaps 20 for divergent flaps 60.

The nozzle arrangement can be formed in various ways, however the nozzle shown herein is disclosed in co-pending application S.N. 209 665, filed Dec. 20, 1971 for BALANCED FLAP CONVERGING-/DIVERGING NOZZLE by Craig E. Swavely et al now patent number 3,730,436. The flaps can be actuated by any means desired and one actuating device is disclosed in co-pending application S.N. 209,664, Filed Dec. 20, 1971 for SYNCHRONIZED EXHAUST NOZZLE ACTUATING SYSTEM by William M. Madden et al.

Figure 3:
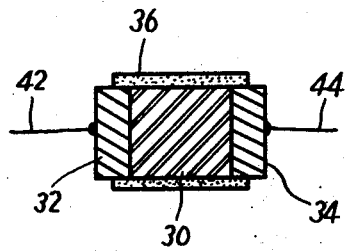
FIG. 3 is a view showing a section through a seal flap along with the ends of adjacent nozzle flaps wherein said nozzle flaps are at their maximum area position.
Figure 2:
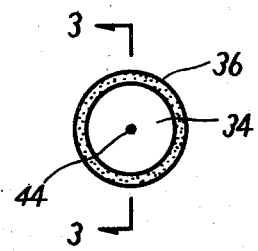
FIG. 2 is an enlarged view of the rear part of FIG. 1 showing a portion of the nozzle in cross section.

A seal flap 20 extends from its pivotal mounting at the forward end of divergent flap 60 to a point adjacent the rearward edge of said flap. Each seal flap 20 is formed of a width so that it will also contact the inner surface of adjacent flaps in the maximum opening of the nozzle flaps. The outer surface of each flap is formed having an angular surface 21 on each side which meets with a flat center surface 23 which extends for the length of the flap at the midportion thereof. The surfaces 21 are angular so as to form the best mating configuration for contacting the inside of the nozzle flap 60. As shown in FIG. 3 the surfaces are at an angle which places them substantially parallel to the inner faces of the flaps 60 when the flaps 60 are in their maximum open position.

A track means 25 is positioned on the outer center surface 23 so that the forward part of the track 27 is positioned approximately at the center of the longitudinal length of the flap. The track means 25 comprises a T-shaped member formed of two L-shaped members 29 welded together. Two arms of the L are welded together to form the single track 27 while the other arms of the L form a flat surface which is welded to the seal flap. The forward part of the track means has an extension 30 which has outstanding flanges at the outer end which form a flat surface 32 for a purpose to be hereinafter described. A bolt member 34 is fixed to the surface 32 with a bolt 36 extending outwardly from the extension 30 for a purpose to be hereinafter described.

A slider member 40 is mounted for slidable movement on the single track 27. The slider member 40 comprises a bottom plate 42 with two angle members 44 and 46 mounted thereon. Each of the angle members 44 and 46 have one arm fixed to the bottom plate 42 while the other arms face upwardly therefrom adjacent to each other and being spaced to slidably accommodate the track 27. An opening 52 is formed in the end of each arm of angle members 44 and 46 fixed to the bottom plate 42. These holes also extend through the bottom plate 42.

Figure 5:
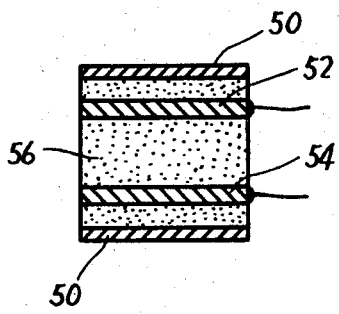
FIG. 5 is a view taken through the edge of a nozzle flap showing the attachment of a positioning arm.
Figure 4:
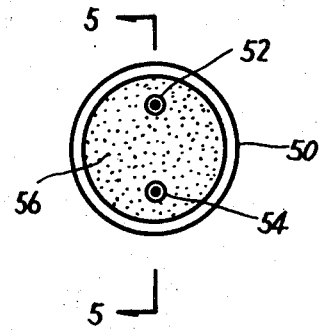
FIG. 4 is a view taken along the line 4—4 of FIG. 3 showing the track means in full and the links removed.
Figure 7:
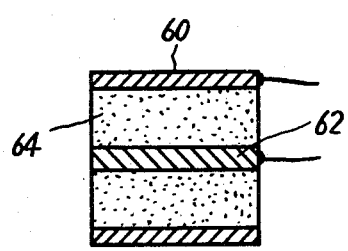
Figure 6:
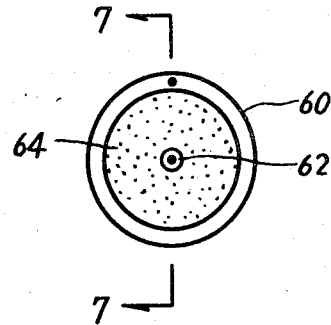
Figure 9:
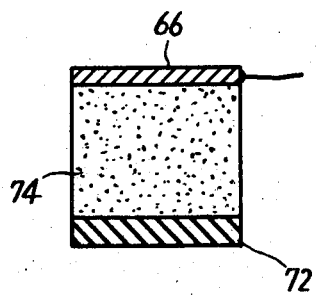
Figure 8:
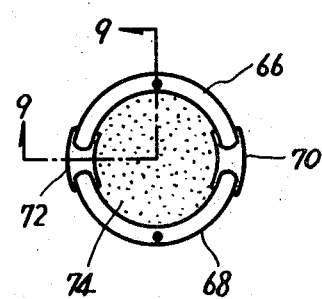
Figure 10:
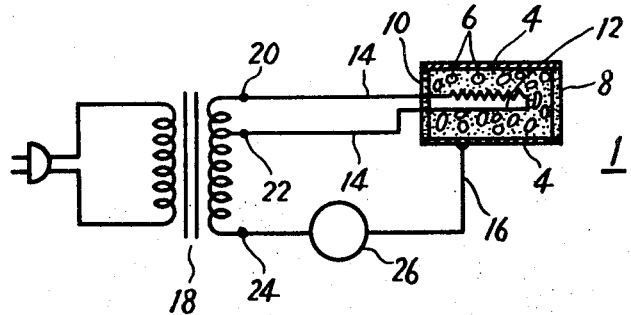

A recess 62 is provided in the side edge of each adjacent flap 60 facing the track means. A link 64 is pivotally mounted at the forward end of each recess to a pin 66. The other end of the link 64 is pivotally connected to the end of the arm extending from the slider member 40 towards the flap 60. The link 64 shown in solid lines in FIG. 5 shows the position of the link when the nozzle flaps are in their minimum area position. The position of the slider member 40 at that time is shown by the dotted line representation in FIG. 4. The link 64 shown in dotted lines in FIG. 5, shows the position of the link when the nozzle flaps are in their maximum area position. The position of the slider member 40 at that time is shown by the solid line representation in FIG. 4.

It can be seen that as an actuating device moves the flaps 60 between the minimum area and maximum area positions the links 64 of equal length will maintain the slider member at the midpoint of the space between the adjacent edges of the flaps. Since the track 27 is positioned at the center of the outer surface of the seal flap then each seal flap is maintained centered over the space between its cooperating nozzle flaps. To hold each seal flap in place, a guide member 72 is fixed to the bolt 34 with its outer ends overlapping the outer side of adjacent flaps for approximately the same distance as the seal flap.

The guide member 72 consists of an elongated plate 74 and a mating reinforcing member 76, said two members being fixed together forming a box section. An opening is located in the central part of the guide member 72 and receives the bolt 34. A nut 35 retains the guide member on the bolt. The guide member 72 is contoured so that each side extends out from the bolt 34 at an angle making it parallel to the cooperating side 21 on the outer surface of the seal flap.

A longitudinal opening 78 is formed in the reinforcing member 76 and an aligned cooperating opening 80 is formed in the plate 74. These openings receive a projection 84 extending from said flap below the pivotal mounting of link 64, that is, below pin 66. As the flaps move between their minimum area and maximum area positions each projection 84 is guided in its openings 78 and 80 to keep each guide member 72 properly aligned.

Further, an exit area schedule selector system for a nozzle such as disclosed herein is disclosed in copending application S.N. 209 803, Filed Dec. 20, 1971 for EXIT AREA SCHEDULE SELECTOR SYSTEM by Kenneth E. Harmon.

I claim:

1. A nozzle having a plurality of nozzle flaps pivotally mounted thereon, each of said nozzle flaps having an inner and outer surface, each of said nozzle flaps having a side edge, a seal flap mounted between each of said adjacent nozzle flaps, each of said seal flaps having an inner and outer surface, each seal flap having overlapping engagement between its outer surface and said inner surfaces of adjacent nozzle flaps, means for centering each seal flap between the adjacent nozzle flaps, means for keeping each seal flap against the adjacent nozzle flaps, said means for centering each seal flap including a track means fixed to the outer surface of said seal flap between adjacent side edges of adjacent nozzle flaps, track follower means mounted on said track means for relative axial movement therewith, a link connecting the side edge of each adjacent nozzle flap to said track follower, means pivotally mounting one end of each link to a track means, second means pivotally mounting the other end of each link to the adjacent edge of its cooperating nozzle flap, each link extending in line with its cooperating nozzle flap.

2. A nozzle as set forth in claim 1 wherein each link is mounted in a recess in the edge of the nozzle flap.

3. A nozzle as set forth in claim 2 wherein each recess is of such a length so as to receive the full length of a link when the nozzle flaps are in their minimum area position.

4. A nozzle as set forth in claim 1 wherein said means for keeping each seal flap against adjacent nozzle flaps comprises a guide member fixed to each seal flap, each guide member extending over the outer surfaces of adjacent nozzle flaps.

5. A nozzle as set forth in claim 4 including means for positioning the longitudinal position of each seal flap, said means for fixing the longitudinal position of each seal flap includes on each side of said guide member on opposite sides of said track means a longitudinal hole therethrough extending outwardly from said track means, follower means extending from the outer surface of adjacent flaps, said follower means extending through said longitudinal holes.

* * * * *

UNITED STATES PATENT OFFICE
CERTIFICATE OF CORRECTION

Patent No. 3,794,244      Dated February 26, 1974

Inventor(s) Connie W. McMath

It is certified that error appears in the above-identified patent and that said Letters Patent are hereby corrected as shown below:

The present Front Page and the drawing Figures should be cancelled and the attached sheets substituted therefor, as part of the Letters Patent. Column 4, line 12, after "track" insert -- follower --.

Signed and sealed this 13th day of August 1974.

(SEAL)
Attest:

McCOY M. GIBSON, JR.
Attesting Officer

C. MARSHALL DANN
Commissioner of Patents